(12) United States Patent
Katoh

(10) Patent No.: US 6,817,718 B2
(45) Date of Patent: Nov. 16, 2004

(54) PROJECTION TYPE OPTICAL DISPLAY SYSTEM

(75) Inventor: Hiromi Katoh, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/692,758

(22) Filed: Oct. 27, 2003

(65) Prior Publication Data

US 2004/0085636 A1 May 6, 2004

(30) Foreign Application Priority Data

Oct. 28, 2002 (JP) ......................................... 2002-312717

(51) Int. Cl.[7] ......................... G03B 21/00; G03B 21/14; G02F 1/1335; H04N 9/31
(52) U.S. Cl. ........................... 353/31; 353/84; 353/122; 349/5; 348/744
(58) Field of Search ........................... 353/31, 84, 122; 348/762, 767, 761, 766, 744; 349/5, 95, 108; 359/495, 497, 15

(56) References Cited

U.S. PATENT DOCUMENTS

| | | | |
|---|---|---|---|
| 5,161,042 A | 11/1992 | Hamada | 359/41 |
| 5,506,701 A | 4/1996 | Ichikawa | 359/15 |
| 5,748,164 A * | 5/1998 | Handschy et al. | 345/89 |
| 5,969,832 A | 10/1999 | Nakanishi et al. | 359/15 |
| 6,061,103 A * | 5/2000 | Okamura et al. | 348/767 |
| 6,707,516 B1 * | 3/2004 | Johnson et al. | 349/78 |
| 2003/0090597 A1 | 5/2003 | Katoh | 348/744 |
| 2003/0095092 A1 * | 5/2003 | Kume et al. | 345/87 |

FOREIGN PATENT DOCUMENTS

| | | | | |
|---|---|---|---|---|
| JP | 59-230383 A | 12/1984 | | H04N/9/31 |
| JP | 5-249318 A | 9/1993 | | G02B/5/32 |

OTHER PUBLICATIONS

Jeffrey A. Shimizu, "Single Panel Reflective LCD Optics", IDW '99 pp. 989–992.

* cited by examiner

Primary Examiner—David Gray
Assistant Examiner—Melissa J Koval
(74) Attorney, Agent, or Firm—Birch, Stewart, Kolasch & Birch, LLP

(57) ABSTRACT

A projection type optical display system includes: a light source; a display panel with light-modulating pixel regions; a light control system for splitting the emitted light into light rays falling within multiple wavelength ranges and focusing the rays onto associated pixel regions according to their wavelength ranges; an optical system for forming an image on a projection plane by utilizing the light modulated; a circuit for generating image subframe data from image frame data and getting the image subframes displayed by the panel time-sequentially; and an optical shifter for shifting, on the projection plane, one of the image subframes being displayed by the panel. The optical shifter is optimized to an outgoing light ray of the panel, which falls within a wavelength range with the highest luminosity, so as to shift the ray on the projection plane an integral number of times as long as the pixel pitch of the panel.

7 Claims, 10 Drawing Sheets

(X): EXTRAORDINARY RAY
(ORD): ORDINARY RAY

COLOR SEPARATION ANGLE

DIRECTION OF OPTIC AXIS (X): EXTRAORDINARY RAY
(ORD): ORDINARY RAY

PROJECTION TYPE OPTICAL DISPLAY SYSTEM

This nonprovisional application claims priority under 35 U.S.C. § 119(a) on Patent Application No. 2002-312717 filed in JAPAN on Oct. 28, 2002, which is herein incorporated by reference.

BACKGROUND OF THE INVENTION

1. Field of the Invention

The present invention generally relates to an optical display system, and more particularly relates to a single-panel projection type optical display system, which can conduct a display operation in full colors with a single display panel and without using color filters. The present invention is effectively applicable for use in a compact projection type color liquid crystal TV system or information display system.

2. Description of the Related Art

A projection type optical display system that uses a liquid crystal display (LCD) panel is known as an optical display system. Such a projection type optical display system needs to be separately provided with a light source because the LCD panel itself emits no light. However, the projection type optical display system using an LCD panel is advantageous over a projection type optical display system using a CRT, because the display system of the former type realizes a broader color reproducible range, has a smaller size and a lighter weight, and needs no convergence correction.

A projection type optical display system may conduct a full-color display operation either by a three-panel method (i.e., with three LCD panels used for the three primary colors) or by a single-panel method (i.e., with just one LCD panel used).

A three-panel projection type optical display system uses an optical system for splitting white light into three light rays representing the three primary colors of red (R), green (G) and blue (B) and three LCD panels for modulating the R, G and B light rays and thereby forming three image components. By optically superimposing the R, G and B image components one upon the other, the three-panel projection type optical display system can create an image in full colors.

The three-panel projection type optical display system can efficiently utilize the light that is radiated from a white light source but needs a complicated optical system and a greater number of components. Thus, the three-panel projection type optical display system is normally less advantageous than the single-panel projection type optical display system in respects of cost and size.

The single-panel projection type optical display system uses a single LCD panel including multiple R, G and B color filters that are arranged in a mosaic or striped pattern, and gets a full-color image, displayed on the LCD panel, projected onto a projection plane (e.g., a screen) by a projection optical system. Such a single-panel projection type optical display system is described in Japanese Laid-Open Publication No. 59-230383, for example. The single-panel type uses only one LCD panel, and needs an optical system that is much simpler than that of the three-panel type. Thus, the single-panel method can be used effectively to provide a small-sized projection type optical display system at a reduced cost.

In the single-panel type that uses color filters, however, light is absorbed into the color filters. Accordingly, compared to a three-panel type that uses a similar light source, the brightness of the image decreases to about one-third in the single-panel type. In addition, one pixel should be displayed by a set of three pixel regions of the LCD panel that correspond to R, G and B, respectively. Thus, the resolution of the image also decreases to one-third as compared to the three-panel type.

One of possible measures against that decrease in brightness is using a brighter light source. However, the use of a light source with great power dissipation for a consumer electronic appliance is not preferred. Also, when color filters of absorption type are used, the light that has been absorbed into the color filters changes into heat. Accordingly, if the brightness of the light source is increased excessively, then not only the temperature of the LCD panel increases but also the discoloration of the color filters is accelerated. For that reason, to increase the utility value of the projection type optical display system, it is very important how to make full use of the given light.

To increase the brightness of an image displayed by a single-panel projection type optical display system, a liquid crystal display device for conducting a display operation in full colors without using any color filter was developed and disclosed in Japanese Laid-Open Publication No. 4-60538, for example. In this liquid crystal display device, the white light that has been radiated from a light source is split into R, G and B light rays by dielectric mirrors such as dichroic mirrors. The light rays are then incident onto a microlens array at mutually different angles. The microlens array is provided on one side of an LCD panel so as to face the light source. These light rays that have been incident onto a microlens are transmitted through the microlens so as to be focused onto their associated pixel regions in accordance with the respective angles of incidence. Thus, the R, G and B split light rays are modulated by mutually different pixel regions and then used for a full-color display.

A display system, which uses transmissive hologram elements for the R, G and B light rays instead of the dielectric mirrors to utilize the light as efficiently as possible, is disclosed in Japanese Laid-Open Publication No. 5-249318. On the other hand, a display system, which includes a transmissive hologram element having a periodic structure defined by a pixel pitch and functioning as the dielectric mirrors or microlenses, is disclosed in Japanese Laid-Open Publication No. 6-222361.

The low resolution is another problem of the single-panel type. As for this problem, however, by adopting a field sequential technique, even just one LCD panel can achieve a resolution comparable to that of the three-panel type. The field sequential technique utilizes the phenomenon that when the colors of a light source are switched at too high a rate to be sensed by the human eyes, respective image components to be displayed time-sequentially have their colors mixed together by an additive color mixture process. This phenomenon is called a "continuous additive color mixture process".

A projection type optical display system for conducting a full-color display operation by the field sequential technique may have a configuration such as that shown in FIG. 15, for example. In this optical display system, a disk, made up of R, G and B color filters, is rotated at a high velocity that corresponds to one vertical scan period of an LCD panel, and image signals, representing the colors of the three color filters, are sequentially input to the driver circuit of the LCD panel. In this manner, a synthesized image of three image components corresponding to the respective colors is recognized by human eyes.

In the display system of such a field sequential type, the R, G and B image components are displayed time-sequentially by each pixel of the LCD panel unlike the single-panel type. Thus, the resolution thereof is comparable to that of the three-panel type.

A projection type optical display system that irradiates mutually different regions of an LCD panel with the R, G and B light rays is disclosed as another display system of the field sequential type in Proc. International Display Workshop 1999 (IDW '99), December 1999, pp. 989–992. In this display system, the white light that has been radiated from a light source is split by dielectric mirrors into R, G and B light rays, which will be then focused onto mutually different regions of the LCD panel. The portions of the LCD panel to be irradiated with the R, G and B light rays are sequentially switched by rotating a cubic prism.

However, the display systems disclosed in Japanese Laid-Open Publications Nos. 4-60538, 5-249318 and 6-222361 identified above can increase the brightness but the resolution thereof remains one-third of that of the three-panel type. The reason is that three spatially separated R, G and B pixels are used as a set to represent one pixel (or dot).

In contrast, the normal field-sequential type can increase the resolution to a level comparable to that of the three-panel type. However, the brightness of the image achieved by the normal field-sequential type is no more satisfactory than the conventional single-panel type because the field-sequential type uses color filters.

In the display system disclosed in IDW '99 on the other hand, the points of incidence of the R, G and B light rays should not overlap with each other. For that purpose, illuminated light having a very high degree of parallelism is needed. Accordingly, the optical efficiency also decreases as being constrained by the degree of parallelism of the illuminated light.

Thus, none of the conventional techniques described above can increase the brightness and the resolution at the same time or solve the problems of the single-panel type.

To overcome these problems, the applicant of the present application proposed improved single-panel projection type optical display systems in Japanese Laid-Open Publication No. 9-214997 and in pamphlet of PCT International Publication No. WO 01/96932.

The projection type optical display system as disclosed in Japanese Laid-Open Publication No. 9-214997 uses a liquid crystal display device similar to that disclosed in Japanese Laid-Open Publication No. 4-60538 identified above. The display system also splits the white light into light rays in respective colors and then makes these light rays incident onto their associated pixel regions at mutually different angles by similar methods. To increase the optical efficiency and the resolution at the same time, this projection type optical display system divides each image frame into multiple image subframes time-sequentially and periodically switches the angles of incidence of the light rays every time one vertical scan period of the LCD panel passes.

In the projection type optical display system disclosed in PCT International Publication No. WO 01/96932, the white light is split by dichroic mirrors into R, G and B light rays, which are then incident at mutually different angles onto their associated pixel regions of the same LCD panel through a microlens array. Also, data representing a plurality of image subframes are generated from data representing each image frame as an image component. Then, the image subframes are displayed on the LCD panel time-sequentially. Thereafter, by sequentially shifting these image subframes on a projection plane, the same area on the projection plane is sequentially irradiated with multiple light rays that have been modulated by mutually different pixel regions of the LCD panel and that fall within respectively different wavelength ranges (which will be referred to herein as "R, G and B light rays").

These projection type optical display systems use no color filters, thus achieving high optical efficiency and displaying an image at a high resolution.

In the optical display system disclosed in PCT International Publication No. WO 01/96932, however, the R, G and B light rays are incident onto the LCD panel at mutually different angles, modulated by the LCD panel, and then leave the LCD panel at respectively different angles again. Although the R, G and B light rays leave the LCD panel at such different angles after having been modulated by the panel, these light rays must be shifted to the same degree on the projection plane such that the same area on the projection plane is sequentially irradiated with the R, G and B light rays that have been modulated by mutually different pixel regions.

Accordingly, unless these modulated R, G and B light rays completely overlap with each other on the projection plane, an unwanted periodic dotted pattern will appear on the projection plane, thus decreasing the quality of the projected image significantly.

SUMMARY OF THE INVENTION

In order to overcome the problems described above, preferred embodiments of the present invention provide a projection type optical display system, which realizes the display of a bright, high-resolution and uniform image of quality and which can effectively contribute to cutting down the overall size and cost of optical display systems.

A projection type optical display system according to a preferred embodiment of the present invention preferably includes a light source, a display panel, a light control system, an optical system, a circuit and an optical shifter. The display panel preferably includes multiple pixel regions, each of which is able to modulate light. The light control system preferably splits the light, which has been emitted from the light source, into light rays falling within a number of wavelength ranges and preferably focuses the split light rays onto associated ones of the pixel regions according to the wavelength ranges thereof. The optical system preferably forms an image on a projection plane by utilizing the light that has been modulated by the display panel. The circuit preferably generates data representing multiple image subframes from data representing each image frame as a component of the image and preferably gets the image subframes displayed by the display panel time-sequentially. The optical shifter preferably shifts, on the projection plane, a selected one of the multiple image subframes being displayed by the display panel. In this optical display system, the optical shifter is preferably optimized to one of the split outgoing light rays of the display panel, which falls within a wavelength range with the highest luminosity to human beings, so as to shift the light ray on the projection plane an integral number of times as long as the pixel pitch of the display panel.

In one preferred embodiment of the present invention, the optical shifter preferably includes a first optical shifting section and a second optical shifting section, each including: a liquid crystal layer, which changes the polarization direction of an incoming light ray; and a birefringent plate, which exhibits one of multiple different refractive indices according to the polarization direction of the incoming light ray. The angle defined by the optic axis of the birefringent plate of each of the first and second optical shifting sections with respect to a normal to the incident plane thereof and the thickness of the birefringent plate are optimized to the light ray that falls within the wavelength range with the highest luminosity.

In a specific preferred embodiment, the light ray that falls within the wavelength range with the highest luminosity preferably includes a light ray with a wavelength of about 550 nm.

In this particular preferred embodiment, the optic axis of each of the birefringent plates of the optical shifter preferably defines an angle θ of about 40 degrees to about 50 degrees with respect to the normal to the incident plane of the birefringent plate.

More specifically, the light ray that falls within the wavelength range with the highest luminosity preferably impinges onto the incident plane of the birefringent plate of the first optical shifting section so as to define an angle α with respect to the normal to the incident plane. Also, the light ray that falls within the wavelength range with the highest luminosity preferably defines an angle θ+α with respect to the optic axis of the birefringent plate.

In a specific preferred embodiment, the birefringent plate is preferably a quartz plate.

In another preferred embodiment, the light control system preferably includes: a plurality of dichroic mirrors for splitting white light, which has been emitted from the light source, into the multiple light rays falling within the wavelength ranges; and a microlens array, which is provided on the display panel so as to focus the split light rays onto their associated pixel regions of the display panel.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
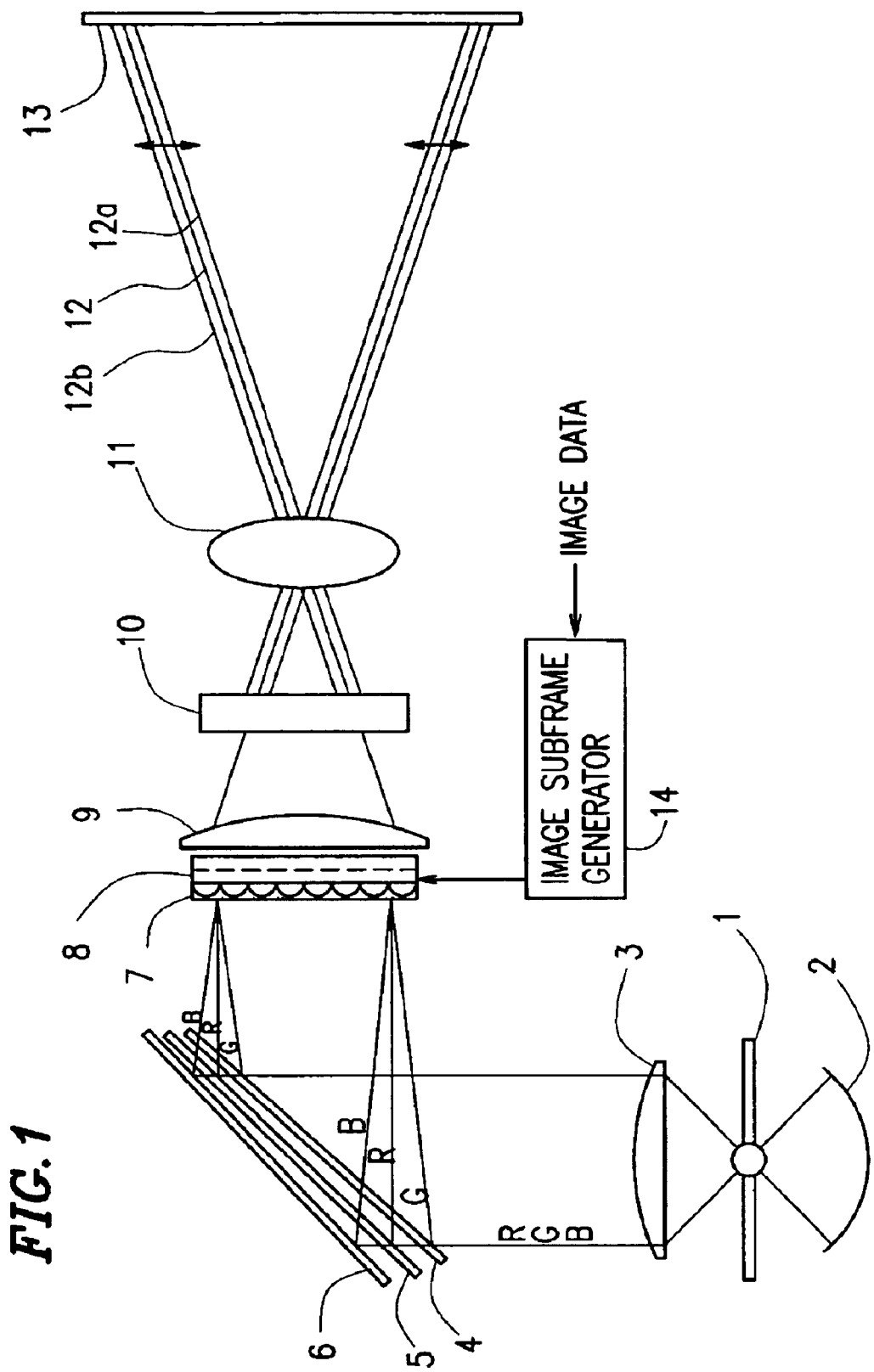
FIG. 1 is a schematic representation illustrating a projection type optical display system according to a preferred embodiment of the present invention.

In a projection type optical display system according to a preferred embodiment of the present invention, white light that has been emitted from a light source is split by a light control system such as dichroic mirrors into three light rays that fall within three wavelength ranges representing the three primary colors of red (R), green (G) and blue (B), respectively, as disclosed in pamphlet of PCT International Publication No. WO 01/96932. The split R, G and B light rays are then focused by a microlens array onto mutually different pixel regions of a display panel. In this case, the light ray entering each of those pixel regions does not change its colors with time.

On the display panel, data representing multiple image subframes, generated from data representing each image frame as an image component, are presented time sequentially. For example, each image frame may be divided into three image subframes, which are presented on the display panel so as to be shifted from each other by one pixel. In this case, one of multiple pixels, which make up one complete image frame, is associated with one of the pixel regions of the display panel, which is exposed to the R, G or B light ray.

The R, G and B light rays that entered the display panel at mutually different angles leave the display panel at respectively different angles again. The outgoing R, G and B light rays have been modulated by the display panel with the image subframe data and now represent those image subframes by themselves.

Then, a selected one of the image subframes is shifted by an optical shifter and presented on the projection plane.

According to this method, if each set of pixels in the three primary colors to be projected onto the identical position on the projection plane time sequentially shift from each other unintentionally, then the projected image will have a dotted pattern on the overall screen and may result in deterioration of image quality. Thus, it is important to accurately control the magnitude of shift to be caused by the optical shifter.

In a preferred embodiment of the present invention, the optical shifter preferably includes a birefringent element, which exhibits one of multiple different refractive indices according to the polarization direction of an incoming light ray, and a polarization direction switching element, which changes the polarization direction of the light ray that is going to enter the birefringent element. The magnitude of shift caused by the optical shifter changes with the direction of the optical axis of the light ray that is going to enter the birefringent element and with the thickness of the birefringent element. That is to say, the difference in the angle of incidence among the R, G and B light rays that are about to enter the optical shifter changes the magnitude of shift on the projection plane and deteriorates the quality of the image projected.

Thus, preferred embodiments of the present invention provide a projection type optical display system that can display an image of quality by minimizing the magnitude of shift to be made by the optical display system. The present invention is not limited to a projection type optical display system but is also effectively applicable for use in a direct viewing type optical display system such as viewer or head mounted display. In the following description, however, preferred embodiments of the present invention will be described as being applied to such a projection type optical display system.

Hereinafter, an exemplary arrangement for a projection type optical display system according to a specific preferred embodiment of the present invention will be described with reference to FIGS. 1, 2 and 3.

The projection type optical display system of this preferred embodiment includes a light source 1, an LCD panel 8, a light control system and a projection optical system. The light control system is provided to focus the light, emitted from the light source 1, onto associated pixel regions of the LCD panel 8 in accordance with the wavelength ranges thereof. The projection optical system is arranged so as to project the light rays, which have been modulated by the LCD panel 8, onto a projection plane.

The light control system includes a spherical mirror 2, a condenser lens 3 and dichroic mirrors 4, 5 and 6. The spherical mirror 2 reflects the (white) light, which has been emitted backward from the light source 1, forward. The condenser lens 3 collimates the light, which has come from the light source 1 and the spherical mirror 2, into a parallel light beam. Then, the light beam is split by the dichroic mirrors 4, 5 and 6 into a plurality of light rays according to the wavelength ranges thereof. The light rays that have been reflected by the dichroic mirrors 4, 5 and 6 are then incident onto a microlens array 7 at mutually different angles in accordance with their wavelength ranges. The microlens array 7 is bonded to one of the two substrates of the LCD panel 8 so as to face the light source 1. The light rays, which have been incident onto the microlens array 7 at their respective angles, will be focused on their associated pixel regions that are located at mutually different positions.

In this projection type optical display system, the projection optical system includes a field lens 9 and a projection lens 11 to project the light beam 12, which has been transmitted through the LCD panel 8, onto a screen (i.e., the projection plane) 13. In this preferred embodiment, an optical shifter 10 is provided between the field lens 9 and the projection lens 11. FIG. 1 illustrates light beams 12a and 12b that have been shifted parallel to the projection plane by the optical shifter 10. To get these light beams shifted, however, the optical shifter 10 may be located anywhere between the LCD panel 8 and the screen 13. For example, the optical shifter 10 may also be provided between the projection lens 11 and the screen 13.

Next, the respective members of this projection type optical display system will be described one by one.

In this preferred embodiment, a metal halide lamp having an optical output power of 150 W, an arc length of 5 mm and an arc diameter of 2.2 mm is used as the light source 1 and is arranged such that the arc length direction thereof is parallel to the paper sheet. Examples of other preferred light sources 1 include a halogen lamp, an extra-high voltage mercury lamp and a xenon lamp. The light source 1 for use in this preferred embodiment radiates white light including light rays that fall within three wavelength ranges for the three primary colors.

The spherical mirror 2 is disposed behind the light source 1. The condenser lens 3, having an aperture of 80 mm$\phi$ and a focal length of 60 mm, is provided in front of the light source 1. The spherical mirror 2 is arranged so as to have its center aligned with the center of the emitting portion of the light source 1, while the condenser lens 3 is arranged so as to have its focal point aligned with the center of the light source 1.

In this arrangement, the light emitted from the light source 1 is collimated by the condenser lens 3 so that the LCD panel 8 is illuminated with the collimated light. The degree of parallelism of the light that has passed through the condenser lens 3 may be about 2.2 degrees in the arc length direction (i.e., the direction parallel to the paper of FIG. 1) and about 1 degree in the arc diameter direction.

The LCD panel 8 for use in this preferred embodiment is a transmission type liquid crystal display in which the microlens array 7 is provided on one of two transparent substrates thereof so as to face the light source. Any liquid crystal material or any operation mode may be selected but anyway the LCD panel 8 preferably operates at a sufficiently high speed. In this preferred embodiment, the panel 8 operates in a twisted nematic (TN) mode. The LCD panel 8 includes a plurality of pixel regions for modulating the incoming light. As used herein, the "pixel regions" refer to respective light modulating portions of the display panel that are spatially separated from each other. In this LCD panel 8, a voltage is applied from a pixel electrode, associated with one of those pixel regions, to an associated portion of the liquid crystal layer, thereby changing the optical properties of that portion and modulating the light.

In this LCD panel 8, 768 (H)×1,024 (V) scan lines may be driven by a noninterlaced scanning technique. The pixel regions of the LCD panel 8 are arranged two-dimensionally on the transparent substrates. In this preferred embodiment, the pitch of the pixel regions preferably measures 26 $\mu$m both horizontally and vertically. FIG. 2 illustrates a portion of the LCD panel 8 shown in FIG. 1 and its surrounding portion on a larger scale. As shown in FIG. 2, in this preferred embodiment, the R, G and B pixel regions 8R, 8G and 8B are arranged so as to define a striped pattern in the horizontal direction of the screen (i.e., in the direction coming out of the paper), and each of the microlenses 7a is allocated to one of multiple sets of three pixel regions (i.e., the R, G and B pixel regions 8R, 8G and 8B).

Figure 2:
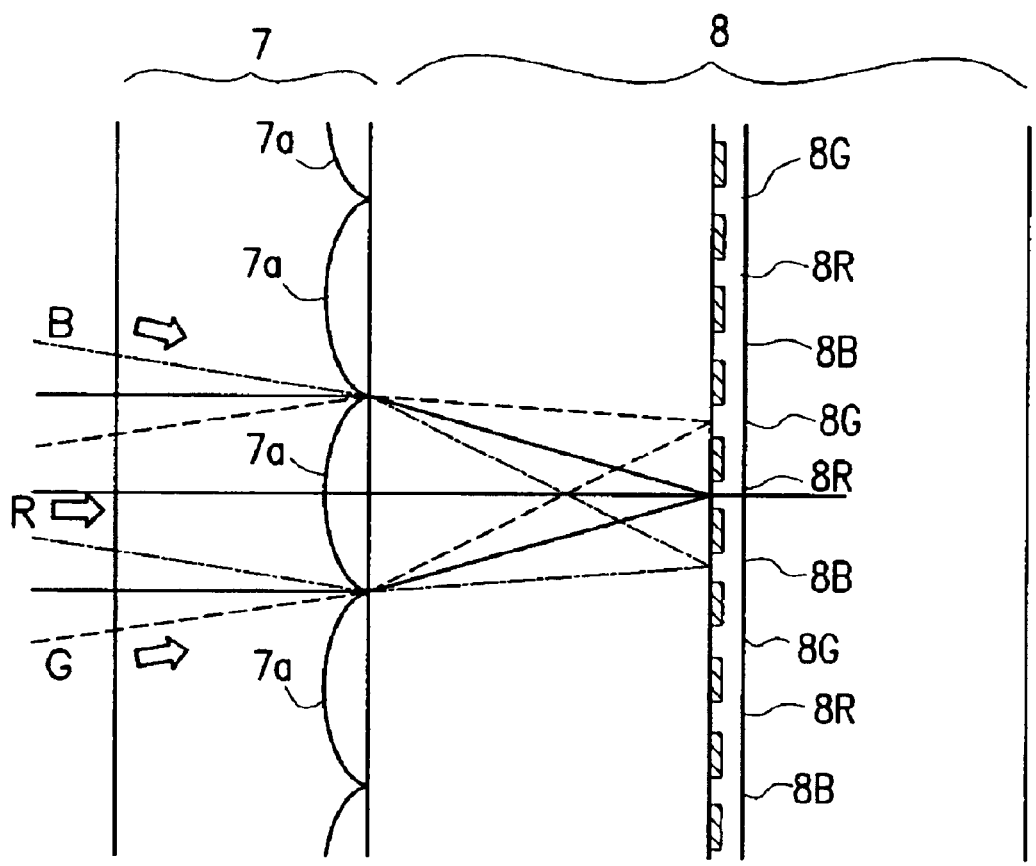
FIG. 2 is a cross-sectional view illustrating, on a larger scale, a portion of the LCD panel and its surrounding portion of the projection type optical display system shown in FIG. 1.

In the preferred embodiment illustrated in FIG. 2, the R, G and B pixel regions 8R, 8G and 8B are arranged so as to define a striped pattern in the horizontal direction of the screen (i.e., in the direction coming out of the paper). Alternatively, the R, G and B pixel regions 8R, 8G and 8B may also be arranged in a mosaic pattern as long as each of the microlenses 7a is allocated to one of multiple sets of three pixel regions (i.e., the R, G and B pixel regions 8R, 8G and 8B).

As shown in FIG. 1, the R, G and B light rays, impinging on the LCD panel 8, have been produced by getting the white light, radiated from the light source 1, split by the dichroic mirrors 4, 5 and 6. The R, G and B light rays are incident onto the microlens array 7 on the LCD panel 8 at mutually different angles. Accordingly, by appropriately setting the angles of incidence of the R, G and B light rays, these light rays may be distributed through one of the microlenses 7a to respective pixel regions corresponding to the three wavelength ranges as shown in FIG. 2. In this preferred embodiment, the microlenses 7a have a focal length of 120 $\mu$m so that an angle of 10.02 degrees is formed between two of these three light rays. More specifically, the R light ray is incident perpendicularly onto the LCD panel 8, while each of the B and G light rays is incident thereon so as to define an angle of 10.02 degrees with the R light ray.

Figure 3:
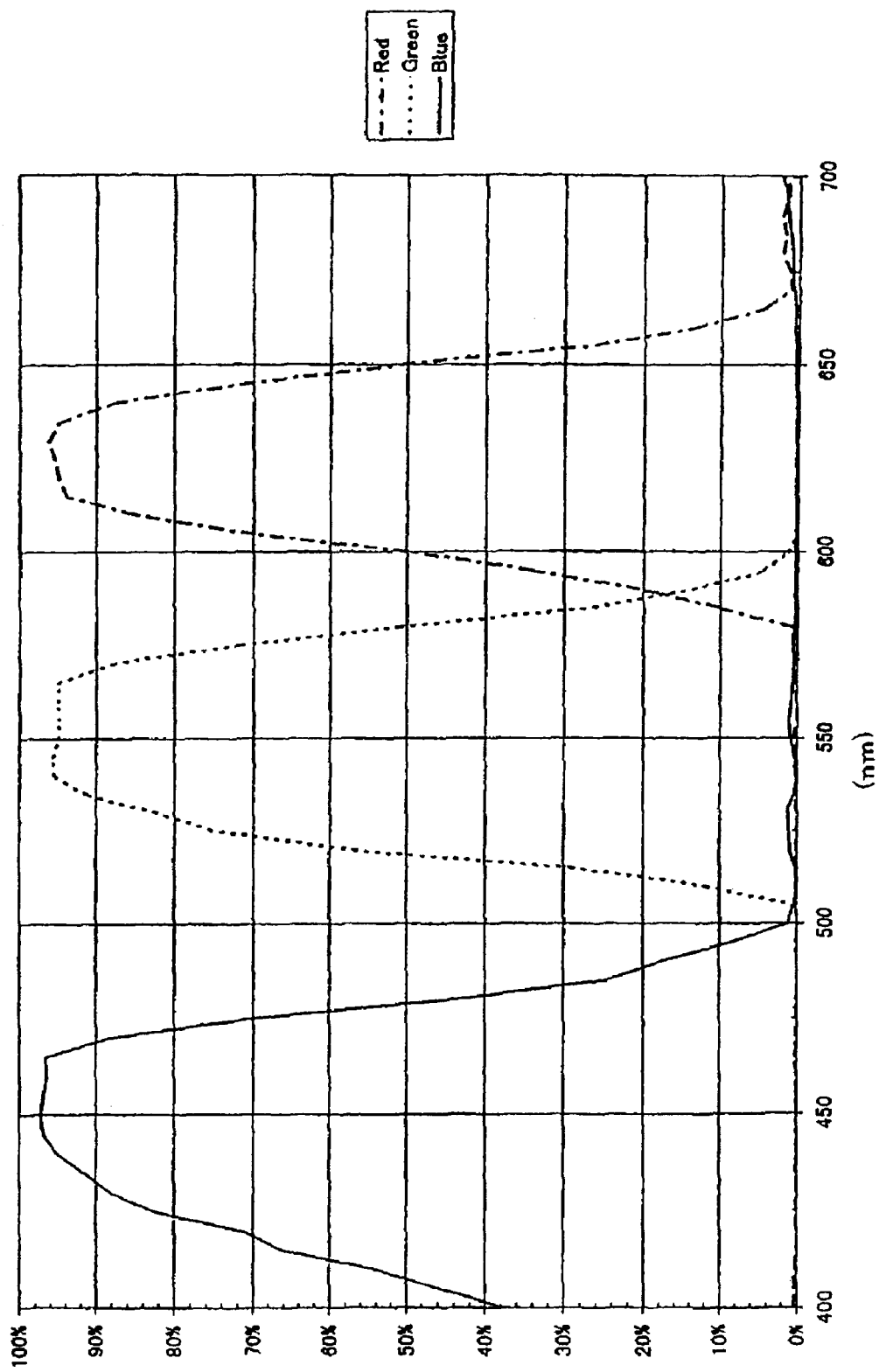
FIG. 3 is a graph showing the spectral characteristics of the dichroic mirrors of the projection type optical display system shown in FIG. 1.

The dichroic mirrors 4, 5 and 6 may have spectral characteristics such as those shown in FIG. 3 and selectively reflect the green (G), red (R) and blue (B) light rays, respectively. The G light ray has a wavelength falling within the range of 520 nm to 580 nm, the R light ray has a wavelength falling within the range of 600 nm to 650 nm, and the B light ray has a wavelength falling within the range of 420 nm to 480 nm.

In this preferred embodiment, the dichroic mirrors 4, 5 and 6 and the microlens array 7 are used to focus the light rays representing the three primary colors onto the respective pixel regions. Alternatively, any other optical element (e.g., a transmission type hologram having diffraction and spectral functions) may also be used.

As described above, the LCD panel 8 is driven by a noninterlaced scanning technique. Accordingly, the panel 8 displays 60 image frames per second. Thus, the time allotted to each frame (i.e., a frame time period T) is ⅟₆₀ second. That is to say, T=⅟₆₀ second≈16.6 milliseconds. It should be noted that if the panel 8 is driven by an interlaced scanning technique, the scan lines on the screen are grouped into even-numbered lines and odd-numbered lines. In the interlaced scanning, either all of these even-numbered scan lines or all of these odd-numbered scan lines are alternately activated. Accordingly, T=⅟₃₀ second≈33.3 milliseconds. Also, the time allotted to each of the even- and odd-numbered fields that make up one frame (i.e., one field time period) is ⅟₆₀ second≈16.6 milliseconds.

The projection type optical display system of this preferred embodiment includes an image subframe generator 14. The image subframe generator 14 receives image data, including information (or data) about the respective image frames that make up one complete image, and sequentially stores the data on frame memories. In accordance with the information that has been selectively read out from the frame memories, the image subframe generator 14 generates multiple image subframes one after another and then gets those image subframes displayed on the LCD panel 8 time-sequentially. Hereinafter, it will be described in detail exactly how the image subframe generator 14 produces the image subframes.

Figure 4:
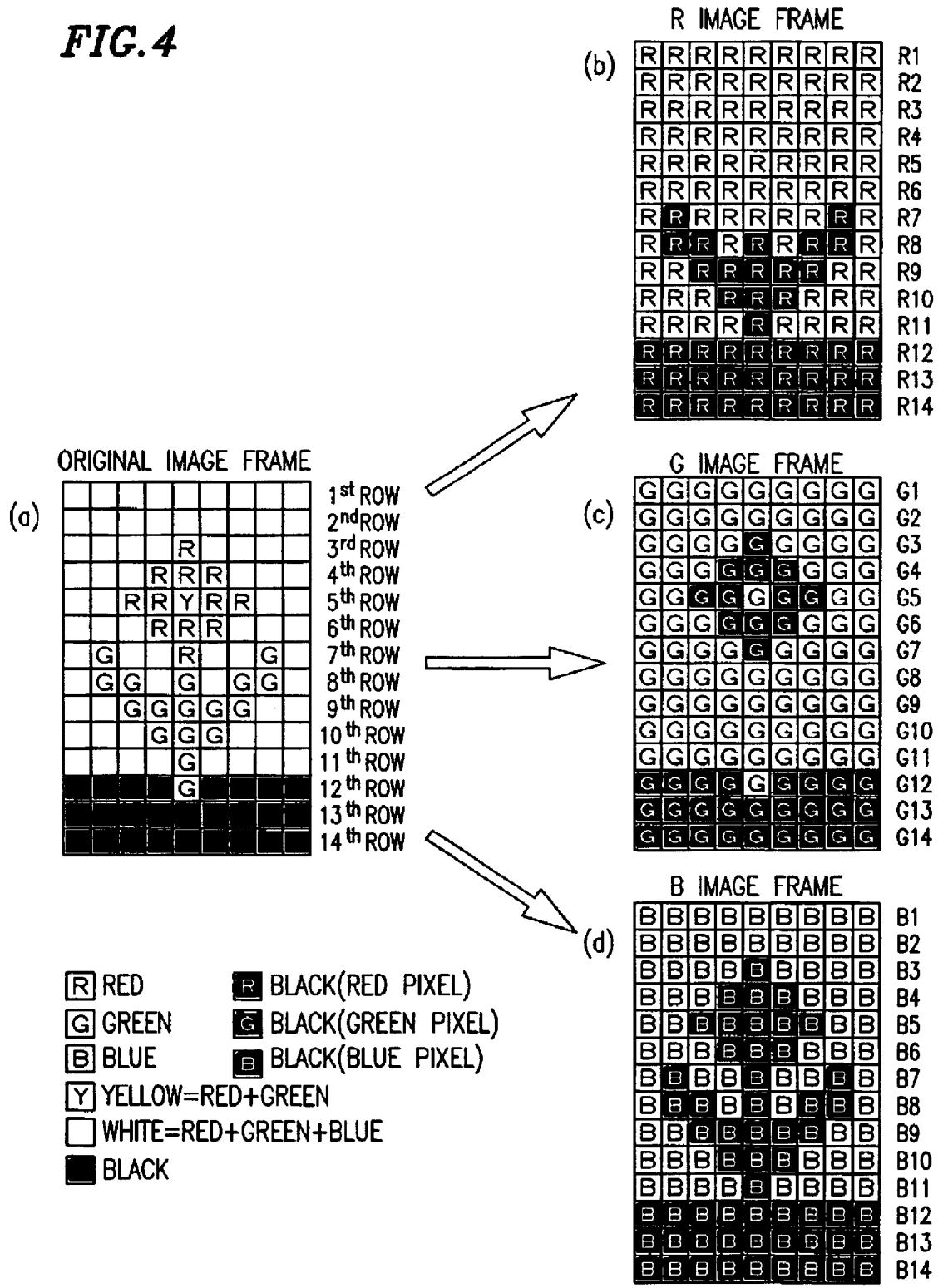
FIG. 4 shows how to produce color-by-color image frames from an original image frame.

For example, suppose an image represented by a frame (i.e., an image frame) is as shown in portion (a) of FIG. 4. This image frame should be displayed in full colors, and the colors of the respective pixels are determined in accordance with the data defining this image frame. It should be noted that in the interlaced scanning technique, an image represented by a field may be processed similarly to an "image frame" as used herein.

First, the color display frame data shown in portion (a) of FIG. 4 is separated into three data subsets corresponding to the R, G and B light rays for the respective pixels, thereby generating three data subsets representing the R, G and B image frames as shown in portions (b), (a) and (d) of FIG. 4. Then, these data subsets are stored on the R, G and B frame memories as shown on the left-hand side of FIG. 5.

Figure 5:
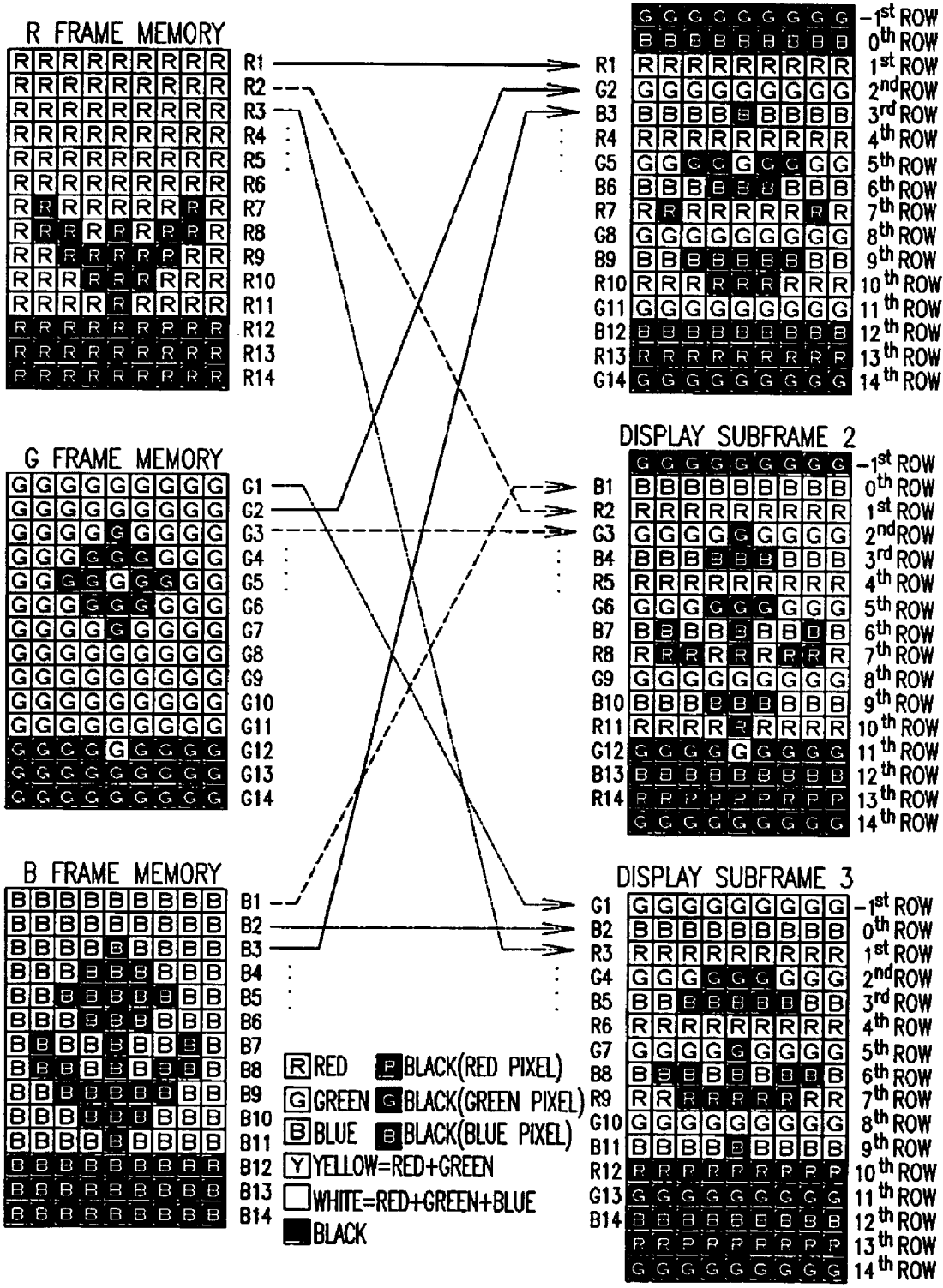
FIG. 5 shows how to generate three subframe data from color-by-color image frame data.
Figure 6:
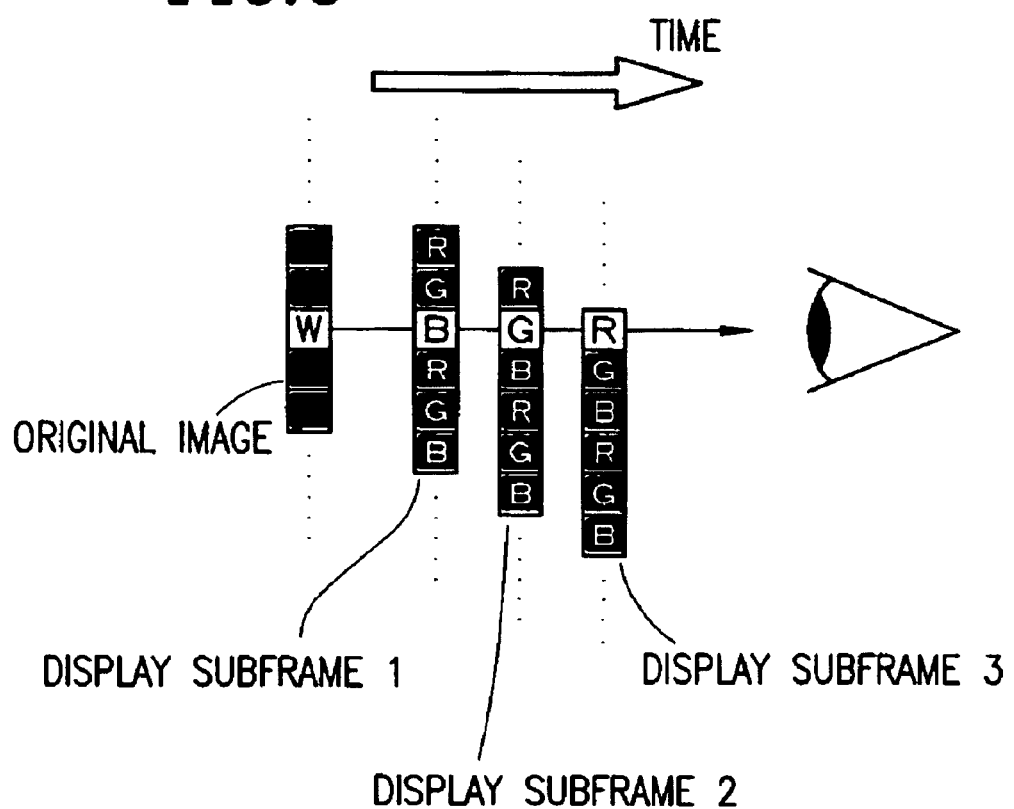
FIG. 6 shows a mode to shift display subframes.

On the other hand, the right-hand side of FIG. 5 shows display subframes Nos. 1, 2 and 3. In this preferred embodiment, an image represented by a display subframe No. 1 is displayed on the projection plane during the first one-third of a frame period (i.e., a first subframe period). During the next one-third (i.e., second subframe period), an image represented by a display subframe No. 2 is displayed. And during the last one-third (i.e., third subframe period), an image represented by a display subframe No. 3 is displayed. In this preferred embodiment, these three image subframes are displayed while being shifted from each other as shown in FIG. 6 and are combined together time sequentially. As a result, an original image such as that shown in portion (a) of FIG. 4 is sensed by the viewer's eyes.

Next, it will be described in detail how the data are arranged in an image subframe by taking display subframe No. 1 as an example. As shown in FIG. 5, the data representing the first row of pixel regions for display subframe No. 1 is the data about the pixels on the first row R1 that is stored in the R frame memory. The data representing the second row of pixel regions for display subframe No. 1 is the data about the pixels on the second row G2 that is stored in the G frame memory. The data representing the third row of pixel regions for display subframe No. 1 is the data about the pixels on the third row B3 that is stored in the B frame memory. And the data representing the fourth row of pixel regions for display subframe No. 1 is the data about the pixels on the fourth row R4 that is stored in the R frame memory. The data representing the remaining rows of display subframe No. 1 will be made up in the same manner after that.

The data representing display subframe No. 2 or 3 is also collected as in display subframe No. 1. As for display subframe No. 2, for example, the data representing the zeroth row of pixel regions is the data about the pixels on the first row B1 that is stored in the B frame memory. The data representing the first row of pixel regions for display subframe No. 2 is the data about the pixels on the second row R2 that is stored in the R frame memory. The data representing the second row of pixel regions for display subframe No. 2 is the data about the pixels on the third row G3 that is stored in the G frame memory. And the data representing the third row of pixel regions for display subframe No. 2 is the data about the pixels on the fourth row B4 that is stored in the B frame memory.

In this manner, the data subsets that have been read out from the R, G and B frame memories are combined in a predetermined order, thereby compiling data representing each of the subframes to be displayed time-sequentially. Thus, the data representing each subframe contains information about all of the three primary colors of R, G and B. However, as for each of these colors R, G and B, the information contained is about just one-third of the entire screen, spatially speaking. More specifically, as can be easily seen from FIG. 5, display subframe No. 1 includes the data about the pixels on the first, fourth, seventh, tenth rows, etc. of the R image frame, the data about the pixels on the second, fifth, eighth, eleventh rows, etc. of the G image frame, and the data about the pixels on the third, sixth, ninth, twelfth rows, etc. of the B image frame. Display subframe No. 2 includes the data about the pixels on the first, fourth, seventh, tenth rows, etc. of the B image frame, the data about the pixels on the second, fifth, eighth, eleventh rows, etc. of the R image frame, and the data about the pixels on the third, sixth, ninth, twelfth rows, etc. of the G image frame. Display subframe No. 3 includes the data about the pixels on the first, fourth, seventh, tenth rows, etc. of the G image frame, the data about the pixels on the second, fifth, eighth, eleventh rows, etc. of the B image frame, and the data about the pixels on the third, sixth, ninth, twelfth rows, etc. of the R image frame. It should be noted that the total number of rows of pixel regions of the display panel is larger by two than the number of pixel rows that make up one subframe image as shown in FIG. 5. These two additional rows are provided as a margin for optical shifting.

To reproduce the original image frame, the first row of the R image frame, the first row of the B image frame and the first row of the G image frame must be combined together. As shown in FIG. 5, the information about the first row of the R image frame is allocated to the first row of display subframe No. 1, the information about the first row of the B image frame is allocated to the zeroth row of display subframe No. 2, and the information about the first row of the G image frame is allocated to the minus first row of display subframe No. 3. Accordingly, each of these image subframes is presented on the projection plane after having been shifted by one pixel from the previous image subframe. Specifically, display subframe No. 2 is shifted by one pixel from display subframe No. 1 and display subframe No. 3 is shifted by two pixels from display subframe No. 1. In this manner, these three display subframes are shifted and presented one after another on each pixel on the projection plane. This optical shifting between each pair of subframes is done by the optical shifter 10.

The method of generating subframes and the method of presenting the subframes time sequentially are not limited to those described above. For example, more than three subframes may be presented time sequentially as disclosed in pamphlet of PCT International Publication No. WO 01/96932.

Hereinafter, the optical shifter 10 and a method of shifting the image subframes using the optical shifter 10 will be described.

Figure 7:
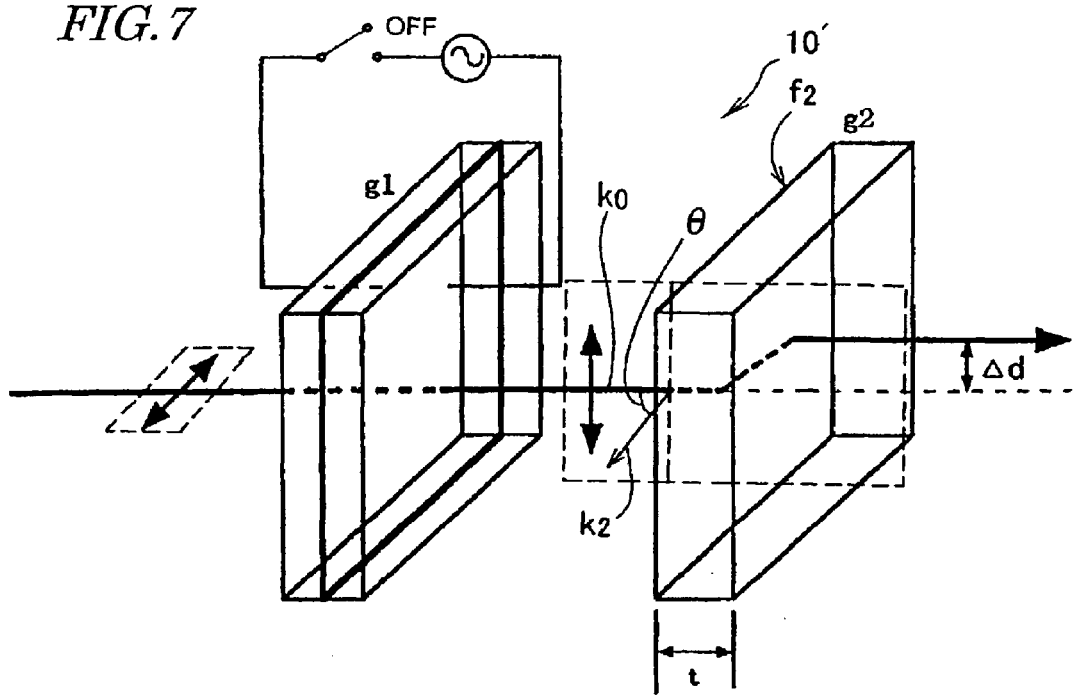
FIGS. 7 and 8 are schematic representations showing the configuration and operation of an optical shifting section of an optical shifter.
Figure 8:
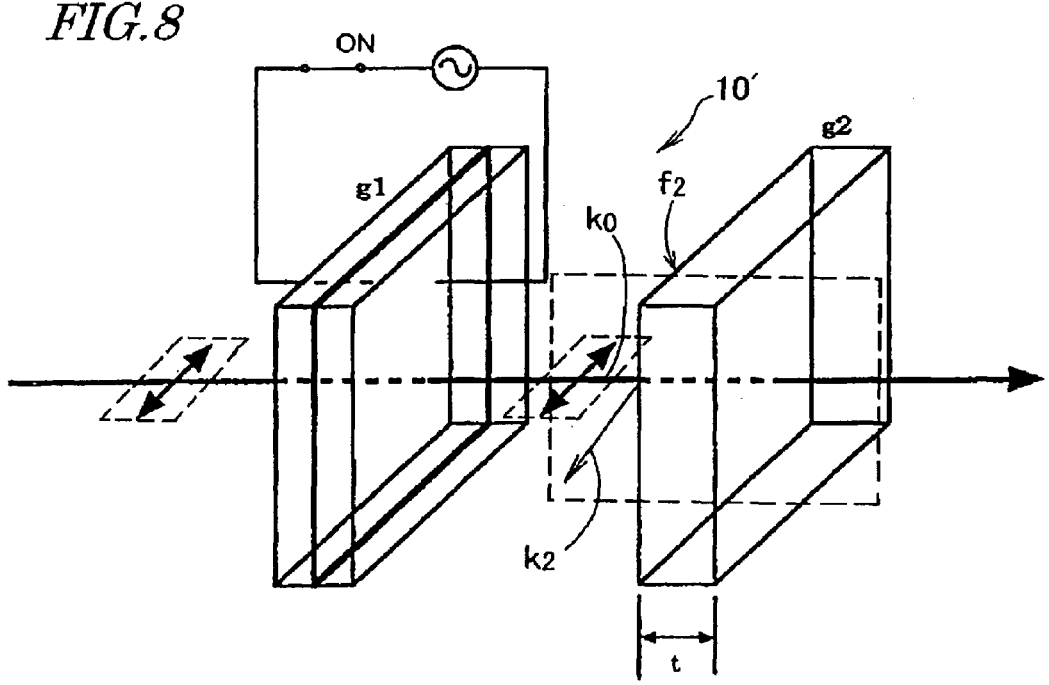

FIGS. 7 and 8 schematically illustrate an optical shifting section 10' included in the optical shifter 10. The optical shifting section 10' preferably includes: a first element (e.g., a liquid crystal element) g1 for changing the polarization direction of an image subframe that has been modulated by the display panel 8 (see FIG. 1) by switching the polarization direction of the incoming light ray between two directions that are perpendicular to each other; and a second element g2 (e.g., a quartz plate) that exhibits one of multiple different refractive indices according to the polarization direction of the incoming light ray. In this specific preferred embodiment, the first element is preferably a liquid crystal element including a liquid crystal layer, and the second element is preferably a quartz plate. As used herein, the "polarization direction" means the direction in which the electric vector of a light ray vibrates. The polarization direction is perpendicular to the propagation direction of a light ray. Also, a plane that includes both the electric vector and the light propagation direction will be referred to herein as a "vibration plane" or "polarization plane".

In the example shown in FIGS. 7 and 8, the light that has gone out of the display panel is polarized horizontally (i.e., polarization direction=horizontal direction on the screen). While no voltage is being applied to the liquid crystal layer of the liquid crystal element g1, the light that has gone out of the display panel has its polarization plane rotated 90 degrees by the liquid crystal layer as shown in FIG. 7. On the other hand, while an appropriate voltage is being applied to the liquid crystal layer of the liquid crystal cell g1, the light that has gone out of the display panel does not have its polarization plane rotated as shown in FIG. 8 while being transmitted through the liquid crystal element g1. In this example, the angle of rotation is supposed to be 90 degrees. However, the angle of rotation may be defined arbitrarily depending on the design of the liquid crystal layer.

The quartz plate g2 preferably consists of uniaxial crystals (or positive crystals) and preferably exhibits birefringence.

Thus, the quartz plate g2 exhibits one of multiple different refractive indices according to the polarization direction of the incoming light ray. The quartz plate g2 is preferably arranged such that its incident plane f2 crosses the optical axis k0 of the incoming light ray at right angles. The optic axis k2 of the quartz plate g2 is included in a perpendicular plane in FIGS. 7 and 8 but still tilts away from the incident plane f2 of the quartz plate g2. As used herein, the "optical axis" means the axis of rotation symmetry of a light ray, while the "optic axis" means a direction in which no birefringence occurs in birefringent crystals. Accordingly, when a light ray having the vertical polarization direction is incident onto the quartz plate g2, the light ray is refracted on the plane, including the optic axis k2, according to the angle θ defined between the optical axis k0 and the optic axis k2 of the quartz plate g2. As a result, the incoming light ray is vertically shifted by Δd as shown in FIG. 7. The optical axis of the outgoing light ray is parallel to that of the incoming light ray. In this case, a plane that includes both the optic axis k2 of the quartz plate g2 and the optical axis k0 of the incoming light ray (which will be referred to herein as a "principal section") is parallel to the plane of polarization of the incoming light ray. Such an incoming light ray having a plane of polarization that is parallel to the principal section is an "extraordinary ray" for the quartz plate g2. In this case, the angle θ is preferably at most equal to 90 degrees.

On the other hand, as shown in FIG. 8, when a light ray having a horizontal plane of polarization is incident onto the quartz plate g2, the light ray is neither refracted nor shifted. This is because the plane of polarization crosses the optic axis k2 of the quartz plate g2 (or the principal section) at right angles. Accordingly, the optical axis of the outgoing light ray of the quartz plate g2 is aligned with that of the incoming light ray thereof. In that case, the light ray that is incident onto the quartz plate g2 is an "ordinary ray" for the quartz plate g2.

In this manner, the polarization direction of the light ray that is going to enter the quartz plate g2 is controlled by selectively applying a voltage to the liquid crystal element g1 and the shift of the light ray going out of the quartz plate g2 is adjusted by making the light ray with one of multiple different polarization directions incident onto the quartz plate g2. In the preferred embodiment described above, a horizontally polarized light ray is incident onto the liquid crystal element g1 and then vertically shifted by the quartz plate g2. Alternatively, a vertically polarized light ray may be incident onto the liquid crystal element g1 and then horizontally shifted by the quartz plate g2.

Figure 9:
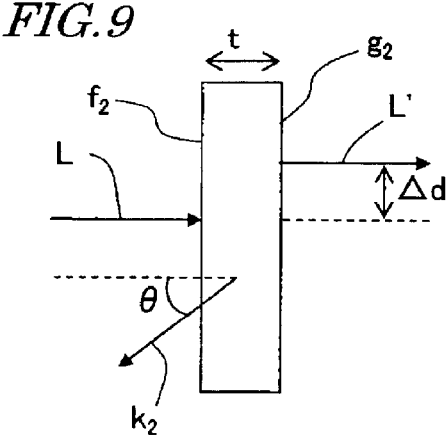
FIG. 9 shows a relationship between the optic axis of a quartz plate for use in the optical shifting section and the direction in which a light ray being transmitted is shifted.

Suppose the quartz plate g2 has a thickness t, the refractive indices of the quartz plate g2 against an extraordinary ray and an ordinary ray are $n_e$ and $n_o$, respectively, and the optic axis k2 defines a tilt angle θ in the principal section with respect to a normal to the incident plane f2 as shown in FIG. 9. Then, the magnitude of shift ΔD of the outgoing light ray L' from the light ray L that was incident perpendicularly onto the quartz plate g2 is given by $$\Delta d = (n_e^2 - n_o^2) \sin\theta \cos\theta \cdot t / (n_e^2 \cos^2\theta + n_o^2 \sin^2\theta) \qquad (1)$$

where Δd is the magnitude of shift, $n_e$ is the refractive index against the extraordinary ray, $n_o$ is the refractive index against the ordinary ray, θ is the angle defined by the optic axis k2 with respect to a normal to the incident plane, and t is the thickness of the quartz plate.

On the other hand, the magnitude of shift Δd of the outgoing light ray from a light ray that was incident obliquely onto the quartz plate g2 is obtained by regarding the angle defined by the optical axis of the light ray that has been incident onto the medium with respect to the optic axis of the quartz as θ in Equation (1) and by applying Snell laws of refraction to calculation between the quartz plate g2 and the medium that contacts with the quartz plate g2.

As can be seen from Equation (1), the magnitude of shift ΔD of the light ray is proportional to the thickness t of the quartz plate g2 and is also changeable with the angle θ defined by the optic axis k2. Thus, by adjusting the thickness t of the quartz plate g2 and the angle θ defined by the optic axis k2, the magnitude of shift of an image subframe can be adjusted to an arbitrary value.

In the optical shifting section 10' of this preferred embodiment, the liquid crystal layer is sandwiched between a pair of transparent electrodes so that an appropriate voltage can be applied to the overall liquid crystal layer at a time. Also, in this preferred embodiment, a TN liquid crystal material with positive dielectric anisotropy $\Delta\in$ is used such that the incoming light ray does not have its polarization direction rotated by aligning the orientation directions of the liquid crystal molecules with the direction of an electric field while a voltage is being applied thereto, and that the incoming light ray has its polarization direction rotated 90 degrees by twisting the orientation directions of the liquid crystal molecules 90 degrees while no voltage is being applied thereto. Alternatively, a TN liquid crystal material with negative dielectric anisotropy $\Delta\in$ may also be used such that the incoming light ray has its polarization direction rotated 90 degrees while a voltage is being applied to the liquid crystal layer and that the incoming light ray does not have its polarization direction rotated while no voltage is being applied thereto.

In this preferred embodiment, the optical shifting section 10' is designed such that an appropriate voltage can be applied to the overall liquid crystal layer at a time. Alternatively, the voltage may also be applied to only a portion of the liquid crystal layer. More preferably, the voltage is sequentially applied to associated portions of the liquid crystal layer synchronously with the scanning of the display panel.

As described above, the optical shifting section 10' can shift the image by Δd by selectively taking either the state shown in FIG. 7 or the state shown in FIG. 8. That is to say, the optical shifting section 10' can select one of two different positions. However, as already described with reference to FIGS. 4 through 6, to superpose the R, G and B light rays one upon the other on the projection plane, the image subframe that has been modulated by the display panel needs to be shifted by one or two pixels on the projection plane. Accordingly, the optical shifter 10 must choose one of at least three different positions.

For that purpose, the optical shifter 10 of this preferred embodiment includes two optical shifting sections 10' such as that shown in FIG. 7 or 8. By arranging these two optical shifting sections 10' in series on the optical path, the optical shifter 10 can selectively shift the image to one of at most four different positions. This optical shifter 10 can select one of four different positions on the projection plane according to the voltage application states of the liquid crystal layers of the two optical shifting sections 10' on the light incoming and outgoing sides on the optical path.

Figure 10:
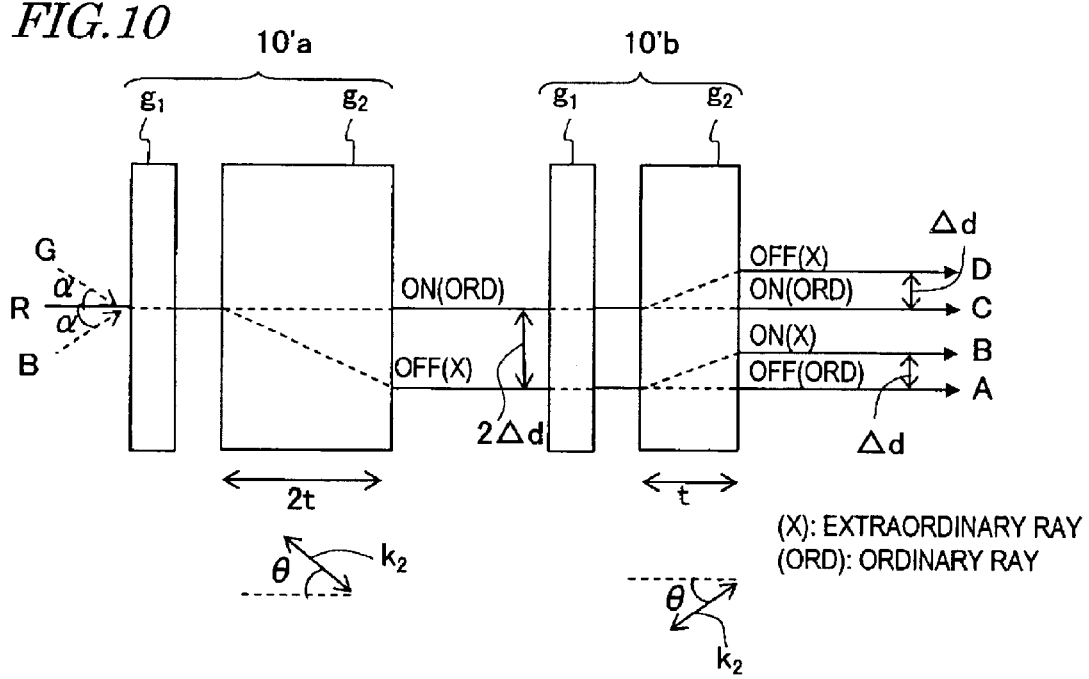
FIG. 10 is a schematic representation showing an optical shifter.

To make those four different positions selectable, a first optical shifting section 10'a, including a quartz plate g2 with a thickness 2t, may be provided on the light incoming side and a second optical shifting section 10'b, including a quartz plate g2 with a thickness t, may be provided on the light outgoing side as shown in FIG. 10, for example, such that the light that has been transmitted through the first optical shifting section 10'a is also transmitted through the second optical shifting section 10'b. As can be seen from Equation (1), the magnitude of shift Δd is proportional to the thickness t of the quartz plate g2. Thus, a shift of two pitches may be caused by the first optical shifting section 10'a and then a shift of one pitch may be caused by the second optical shifting section 10'b. Alternatively, the optical shifting sections 10' on the light incoming and outgoing sides may be interchangeable with each other. That is to say, the second optical shifting section 10'b may be provided on the light incoming side and the first optical shifting section 10'a may be provided on the light outgoing side. Also, to make three different positions selectable, the quartz plates g2 of the optical shifting sections 10' on the light incoming and outgoing sides may have their thicknesses equalized with each other such that a shift of the same pitch is caused by each of these two optical shifting sections 10'. One of the four (or three) different positions is selected according to a particular combination of the voltage application state (i.e., ON or OFF) of the liquid crystal element g1 of the first optical shifting section 10'a on the light incoming side and the voltage application state (i.e., ON or OFF) of the liquid crystal element g1 of the second optical shifting section 10'b on the light outgoing side, i.e., whether the incoming light ray is an ordinary ray or an extraordinary ray for each of these liquid crystal layers.

As shown in FIG. 10, the incoming light ray can take one of two different positions according to the voltage being applied to the liquid crystal element g1 of the first optical shifting section 10'a and the light ray at each of these two positions can further take one of two different positions according to the voltage being applied to the liquid crystal element g1 of the second optical shifting section 10'b. In this case, the optic axes k2 of the quartz plates g2 of the first and second optical shifting sections 10'a and 10'b are both located on a plane that is parallel to the paper, but tilt toward mutually opposite directions with respect to the optical axis of the incoming light ray. Accordingly, the direction in which the extraordinary ray is refracted by the first optical shifting section 10'a is opposite to the direction in which the extraordinary ray is refracted by the second optical shifting section 10'b. Also, the polarization direction of the extraordinary ray transmitted through the first optical shifting section 10'a defines an angle of 90 degrees with that of the ordinary ray transmitted through the first optical shifting section 10'a. Consequently, the condition of shifting this extraordinary ray being transmitted through the second optical shifting section 10'b is opposite to the condition of shifting the ordinary ray being transmitted through the second optical shifting section 10'b.

Hereinafter, it will be described how to design the quartz plate g2 for use in this optical shifter. To define the magnitude of shift caused by the quartz plate g2, the direction of the optic axis k2 and the thickness of the quartz plate g2 need to be determined. First, the optic axis k2 will be described.

Figure 11:
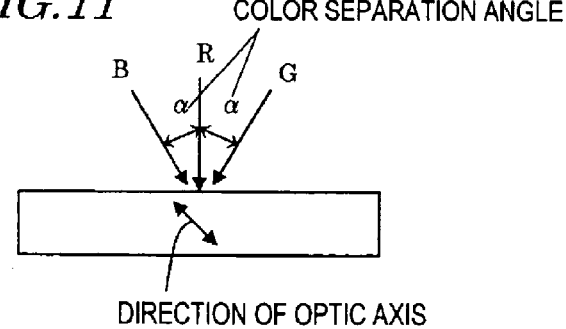
FIG. 11 shows the angle of incidence of R, B and B light rays on a quartz plate.

As described above, in various preferred embodiments of the present invention, the R, G and B light rays that have been incident onto the display panel at mutually different angles leave the display panel at respectively different angles again. Accordingly, the R, G and B light rays are also incident onto the quartz plate g2 of the optical shifter at different angles of incidence. In this preferred embodiment, each of the G and B light rays is incident onto the quartz plate g2 so as to define an angle α of about 10.02 degrees with respect to the R light ray as shown in FIG. 11. This angle α will decrease to about 6.47 degrees in the quartz plate g2 according to the Snell laws of refraction. The angle defined by the B and G light rays with the R light ray interposed between them is 2α, which will be referred to herein as a "color separation angle".

Figure 12:
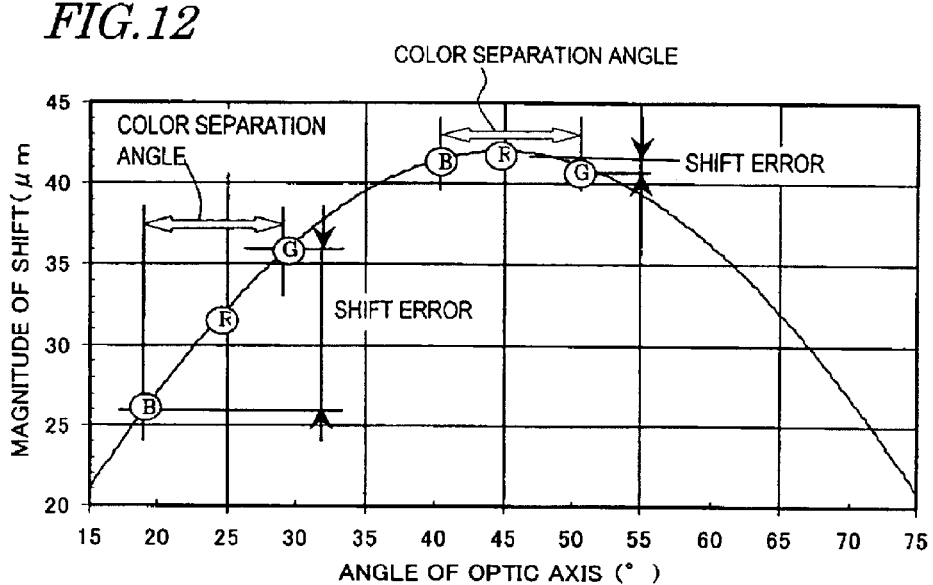
FIG. 12 is a graph showing a relationship between the angle defined by the optic axis of a quartz plate to a normal to the incident plane f2 thereof and the magnitude of shift of the optical axis of the incoming light ray.

FIG. 12 is a graph showing a relationship between the angle θ, which is defined by the optic axis k2 of the quartz plate g2 with respect to a normal to the incident plane as in Equation (1), and the magnitude of shift. As can be easily seen from FIG. 12, when the angle θ is 45 degrees, the magnitude of shift reaches its maximum value. Also, each of the G and B light rays defines a tilt angle α with respect to the R light ray. Accordingly, even when the optic axis k2 defines a predetermined tilt angle θ, the R, G and B light rays are shifted to mutually different degrees. As shown in FIG. 12, when the angle θ is around 45 degrees, the degrees to which the R, G and B light rays are shifted are not so much different from each other. However, as the angle θ increases or decreases from 45 degrees, the difference in the magnitude of shift among the R, G and B light rays increases. That is to say, the difference in the magnitude of shift increases with respect to the same color separation angle.

As can be seen from FIGS. 11 and 12, each of the G and B light rays defines a tilt angle α with respect to the R light ray. Accordingly, if the difference in the magnitude of shift is calculated between the magnitude of shift of the R light ray as the reference and that of the G or B light ray, then the error in the magnitude of shift of each of the two other light rays from that of the reference light ray becomes small. However, the present inventors discovered that the quality of the image projected could be kept sufficiently high by using not so much the R light ray as the G light ray exhibiting a higher luminosity to human beings as the reference light ray, evaluating the difference in the magnitude of shift of the R or B light ray from the best magnitude of shift of the G light ray as the shift error, and minimizing this shift error to a predetermined value or less. That is to say, by optimizing the optical shifter with respect to the G light ray with the high luminosity, the quality of the overall image projected could be kept sufficiently high.

In general, the human beings show the highest luminosity to a light ray with a wavelength of about 550 nm. In this preferred embodiment, the R, G and B light rays fall within the respective wavelength ranges described above. Thus, the G light ray, including a light ray with the wavelength of 550 nm, is used as a reference light ray. However, if a light ray belonging to any other split wavelength range is used, a light ray falling within a split wavelength range with the highest luminosity to human beings may be selected as the reference.

Figure 13:
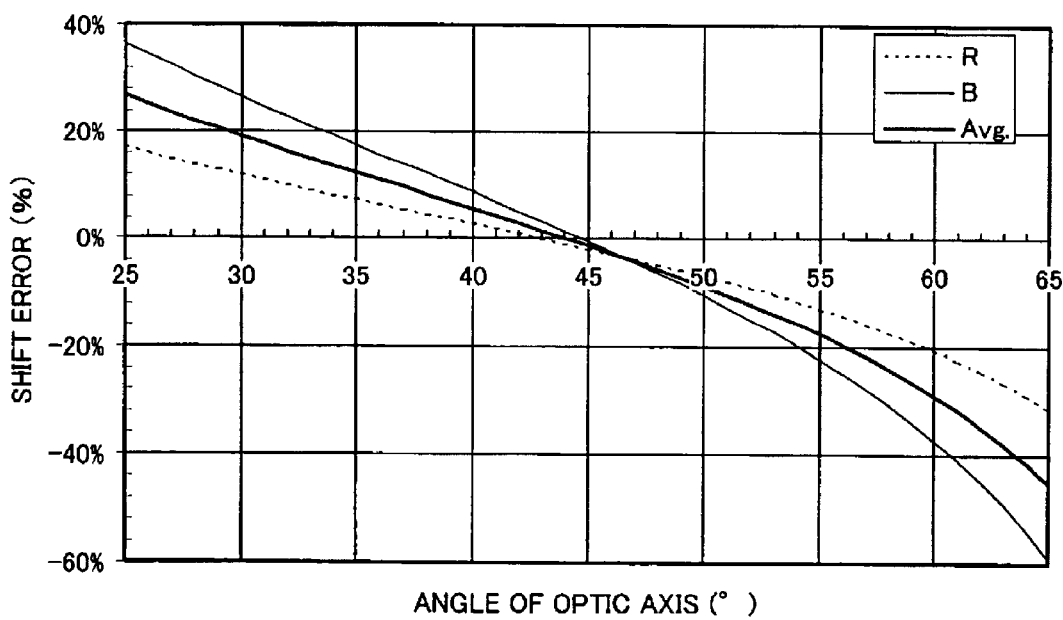
FIG. 13 is a graph showing how the relationship between the angle of the optic axis of the quartz plate and the magnitude of shift of the incoming light ray changes with the wavelength range thereof.

FIG. 13 shows the differences in the magnitude of shift between the G light ray as the reference and the R and B light rays and the average of these two differences as shift errors. As shown in FIG. 13, when the optic axis k2 defines a tilt angle of about 45 degrees (or more exactly 44.8 degrees), the shift errors are minimized and the angular dependence of the incoming light ray on the tilt angle of the optic axis k2 is also minimized. In this preferred embodiment, if the optic axis k2 has a tilt angle of about 37 degrees to about 50 degrees, the shift errors can be decreased to within approximately 10%. On the other hand, if the optic axis k2 has a tilt angle of about 40 degrees to about 48 degrees, the shift errors can be decreased to within approximately 5%. Thus, the optic axis k2 preferably has a tilt angle of about 37 degrees to about 50 degrees, more preferably about 40 degrees to about 48 degrees.

Next, preferred thicknesses of the quartz plates g2 will be described. The thicknesses of the quartz plates g2 when the optic axis k2 has a tilt angle of about 45 degrees and when the R light ray as a reference light ray is shifted by one pixel pitch are obtained from Equation (1). In this preferred embodiment, the quartz plates g2 of the first and second optical shifting sections 10'a and 10'b on the light incoming and outgoing sides have a thickness of about 7.15 mm and a thickness of about 3.57 mm, respectively. The following Table 1 shows the errors (%) of the actual shift positions of the G and B light rays from their expected shift positions in such a situation. In Table 1, the shift positions A, B, C and D correspond to the light rays shown in FIG. 10. As also shown in FIG. 10, on a plane including the optic axis k2 and a normal to the incident plane f2, the R light ray is incident perpendicularly onto the incident plane f2 while the G and B light rays are incident onto the liquid crystal element g1 and quartz plate g2 so as to define an angle of θ+α degrees and an angle of θ−α degrees, respectively, with respect to the optic axis k2. That is to say, the G light ray is allowed to be incident from a direction opposite to that of the optic axis k2 with respect to the normal to the incident plane f2 while the B light ray is allowed to be incident from the same direction as that of the optic axis k2 with respect to the normal to the incident plane f2.

TABLE 1

| | Shift position error (%) | | | | Average |
|---|---|---|---|---|---|
| | A | B | C | D | (%) |
| R | 0.0 | 0.0 | 0.0 | 0.0 | 0.0 |
| G | −3.0 | −1.9 | 0.0 | −1.1 | −1.5 |
| B | −2.2 | −0.7 | 0.0 | −1.5 | −1.1 |

As shown in Table 1, the maximum shift error (i.e., the error of the position of the G light ray from position A) is 3.0% and the overall average is about 0.9%. In this case, the G light ray with a relatively high luminosity has a significant error and the quality of the image projected may be sensed as deteriorated.

Next, the thicknesses of the quartz plates g2 of the first and second optical shifting sections 10'a and 10'b on the light incoming and outgoing sides are optimized to the G light ray such that the G light ray is shifted by one pixel pitch. More specifically, since the G light ray is obliquely incident onto the quartz plate g2, the thicknesses of the quartz plates g2 are obtained by using an angle θ that has been calculated in accordance with the Snell laws of refraction. In this preferred embodiment, the quartz plates g2 of the first and second optical shifting sections 10'a and 10'b on the light incoming and outgoing sides have a thickness of about 7.26 mm and a thickness of about 3.61 mm, respectively. The following Table 2 shows the errors (%) of the actual shift positions of the R and B light rays from their expected shift positions in such a situation:

TABLE 2

| | Shift position error (%) | | | | Average |
|---|---|---|---|---|---|
| | A | B | C | D | (%) |
| R | 3.0 | 1.9 | 0.0 | 1.1 | 1.5 |
| G | 0.0 | 0.0 | 0.0 | 0.0 | 0.0 |
| B | 0.8 | 1.2 | 0.0 | −0.4 | 0.4 |

As shown in Table 2, the error of the G light ray with a relatively high luminosity becomes zero, and the overall average of the shift errors becomes about 0.6%. Thus, by using the G light ray as a reference light ray and designing the optical shifter such that the G light ray is shifted by one pixel pitch, an image of quality can be projected.

Figure 14:
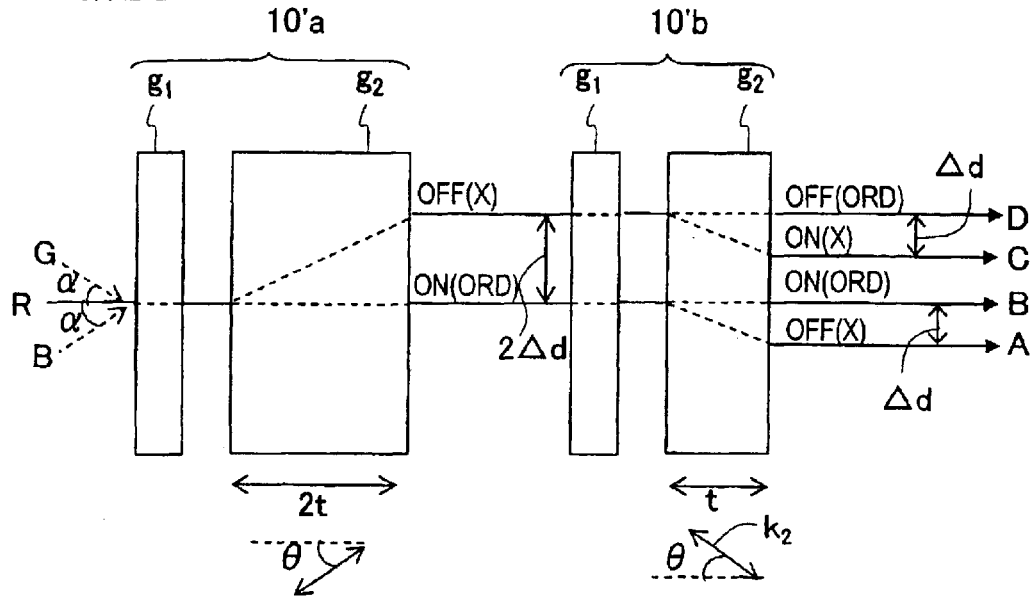
FIG. 14 is a schematic representation showing another optical shifter.
Figure 15:
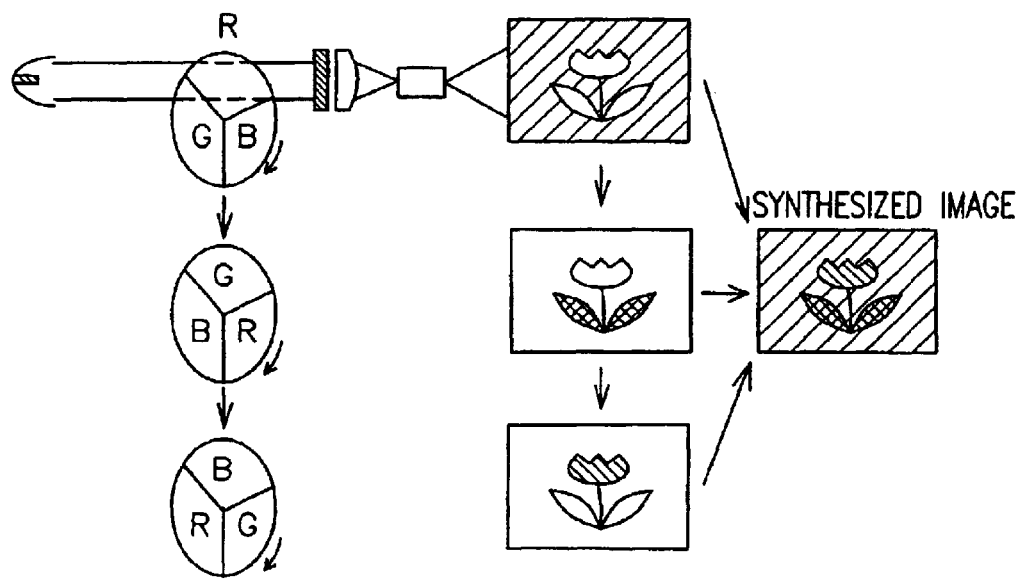
FIG. 15 shows how a conventional field sequential projection type optical display system operates.

Furthermore, the following Table 3 shows the shift errors of the R and B light rays in a situation where the G and B light rays are incident from mutually opposite directions onto the liquid crystal element g1 and quartz plate g2 of the first optical shifting section 10'a so as to define an angle of θ−α degrees and an angle of θ+α degrees, respectively, with respect to the optic axis k2 as shown in FIG. 14. That is to say, the G light ray is incident from the same direction as that of the optic axis k2 with respect to a normal to the incident plane f2 of the liquid crystal element g1 of the first optical shifting section 10'a, while the B light ray is incident from a direction opposite to that of the optic axis k2 with respect to the normal to the incident plane f2 of the liquid crystal element g1 of the first optical shifting section 10'a.

TABLE 3

|   | Shift position error (%) | | | | Average |
|---|---|---|---|---|---|
|   | A | B | C | D | (%) |
| R | 2.2 | 0.7 | 0.0 | 1.5 | 1.1 |
| G | 0.0 | 0.0 | 0.0 | 0.0 | 0.0 |
| B | −0.8 | −1.2 | 0.0 | 0.4 | −0.4 |

As can be seen from Table 3, no light ray has a shift error exceeding 2.2% at any shift position irrespective of the wavelength thereof. Also, the overall average of the shift errors can be further decreased to about 0.5%.

It should be noted that the thicknesses of the quartz plates g2, which have been optimized to the G light ray such that the G light ray is shifted by one pixel pitch, may be somewhat different from the values obtained from Equation (1). Specifically, as long as the differences from the values obtained from Equation (1) fall within the range of ±1%, the deterioration in the quality of the image projected is hardly noticeable. That is to say, the thicknesses of the quartz plates g2 that have been optimized to the G light ray preferably fall within the range of ±1% from the values obtained from Equation (1).

In the foregoing description, preferred embodiments of the present invention have been described as being applied to a projection type optical display system in which a liquid crystal element is used as a display panel. However, the present invention is in no way limited to such specific preferred embodiments. For example, the present invention is also applicable for use even in a projection type optical display system in which a non-liquid crystal element (e.g., a digital mirror device (DMD)) is used as a display panel. Also, if the present invention is applied to a direct viewing optical display system such as a head mounted display, then the retinas of the human eyes function as the projection plane.

Various preferred embodiments of the present invention described above provide a projection type optical display system that can project an image of quality onto a projection plane without forming any periodic dotted pattern there.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A projection type optical display system comprising:
    a light source;
    a display panel including multiple pixel regions, each of which is able to modulate light;
    a light control system for splitting the light, which has been emitted from the light source, into light rays falling within a number of wavelength ranges and focusing the split light rays onto associated ones of the pixel regions according to the wavelength ranges thereof;
    an optical system for forming an image on a projection plane by utilizing the light that has been modulated by the display panel;
    a circuit for generating data representing multiple image subframes from data representing each image frame as a component of the image and getting the image subframes displayed by the display panel time-sequentially; and
    an optical shifter for shifting, on the projection plane, a selected one of the multiple image subframes being displayed by the display panel,
    wherein the optical shifter is optimized to one of the split outgoing light rays of the display panel, which falls within a wavelength range with the highest luminosity to human beings, so as to shift the light ray on the projection plane an integral number of times as long as the pixel pitch of the display panel.

2. The projection type optical display system of claim 1, wherein the optical shifter includes a first optical shifting section and a second optical shifting section, each including:
    a liquid crystal layer, which changes the polarization direction of an incoming light ray; and a birefringent plate, which exhibits one of multiple different refractive indices according to the polarization direction of the incoming light ray, and
    wherein the angle defined by the optic axis of the birefringent plate of each of the first and second optical shifting sections with respect to a normal to the incident plane thereof and the thickness of the birefringent plate are optimized to the light ray that falls within the wavelength range with the highest luminosity.

3. The projection type optical display system of claim 2, wherein the light ray that falls within the wavelength range with the highest luminosity includes a light ray with a wavelength of about 550 nm.

4. The projection type optical display system of claim 3, wherein the optic axis of each of the birefringent plates of the optical shifter defines an angle θ of about 40 degrees to about 50 degrees with respect to the normal to the incident plane of the birefringent plate.

5. The projection type optical display system of claim 4, wherein the light ray that falls within the wavelength range with the highest luminosity impinges onto the incident plane of the birefringent plate of the first optical shifting section so as to define an angle α with respect to the normal to the incident plane, and
    wherein the light ray that falls within the wavelength range with the highest luminosity defines an angle θ+α with respect to the optic axis of the birefringent plate.

6. The projection type optical display system of claim 5, wherein the birefringent plate is a quartz plate.

7. The projection type optical display system of claim 1, wherein the light control system comprises:
    a plurality of dichroic mirrors for splitting white light, which has been emitted from the light source, into the multiple light rays falling within the wavelength ranges; and
    a microlens array, which is provided on the display panel so as to focus the split light rays onto their associated pixel regions of the display panel.

* * * * *